United States Patent
Tomonaga et al.

(10) Patent No.: US 7,742,472 B2
(45) Date of Patent: Jun. 22, 2010

(54) SIGNAL PROCESSING APPARATUS AND STREAM PROCESSING METHOD

(75) Inventors: Eiichiro Tomonaga, Tokyo (JP); Masahiro Yamada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 914 days.

(21) Appl. No.: 11/299,780

(22) Filed: Dec. 13, 2005

(65) Prior Publication Data

US 2006/0140183 A1 Jun. 29, 2006

(30) Foreign Application Priority Data

Dec. 27, 2004 (JP) .............................. 2004-378293

(51) Int. Cl.
*H04J 3/06* (2006.01)
*H04L 12/28* (2006.01)

(52) U.S. Cl. ..................... 370/389; 370/474; 370/503

(58) Field of Classification Search ................ 725/114, 725/131, 138, 139, 144, 151; 370/389, 474, 370/503
See application file for complete search history.

(56) References Cited

U.S. PATENT DOCUMENTS

| | | | | |
|---|---|---|---|---|
| 6,175,871 | B1 * | 1/2001 | Schuster et al. | ............. 709/231 |
| 7,076,150 | B2 * | 7/2006 | Morinaga et al. | ............. 386/65 |
| 7,218,611 | B2 * | 5/2007 | Mimura et al. | ............. 370/241 |
| 7,342,880 | B2 * | 3/2008 | Yanagihara et al. | ......... 370/232 |
| 2002/0067916 | A1 | 6/2002 | Kubo et al. | |
| 2003/0118107 | A1 * | 6/2003 | Itakura et al. | .......... 375/240.19 |
| 2003/0177503 | A1 * | 9/2003 | Sull et al. | .................... 725/112 |
| 2004/0005142 | A1 * | 1/2004 | Yoo et al. | ..................... 386/94 |
| 2004/0218669 | A1 * | 11/2004 | Hannuksela | ........... 375/240.01 |
| 2006/0171684 | A1 * | 8/2006 | Fukuda et al. | .............. 386/112 |
| 2007/0206592 | A1 * | 9/2007 | Itakura et al. | ................ 370/389 |

FOREIGN PATENT DOCUMENTS

| | | |
|---|---|---|
| JP | 2000-341234 | 12/2000 |
| JP | 2003-244599 | 8/2003 |
| JP | 2004-40579 | 2/2004 |

OTHER PUBLICATIONS

Notice of Reason for Rejection from Japanese Patent Office, mailed Feb. 16, 2010, in Japanese Application No. 2004-378293, and English translation thereof (4 pages).

* cited by examiner

*Primary Examiner*—William Trost, IV
*Assistant Examiner*—Roberta A Shand
(74) *Attorney, Agent, or Firm*—Finnegan, Henderson, Farabow, Garrett & Dunner, L.L.P.

(57) ABSTRACT

A signal processing apparatus includes, a receiving unit which receives a stream includes compression-encoded data via a network, the stream being formed by packets to which time stamps are respectively added, a generating unit which generates a first stream from the stream received by the receiving unit, based on the time stamps added to the packets in the stream received by the receiving unit to output the first stream from an output port, a selector to which has a first port that receives the first stream output from the output port and a second port that receives a second stream including compression-encoded data and being transmitted in real time from outside, the selector selecting one of the first stream input to the first port and the second stream input to the second port, and a decoding unit which decodes the one stream selected by the selector.

6 Claims, 4 Drawing Sheets

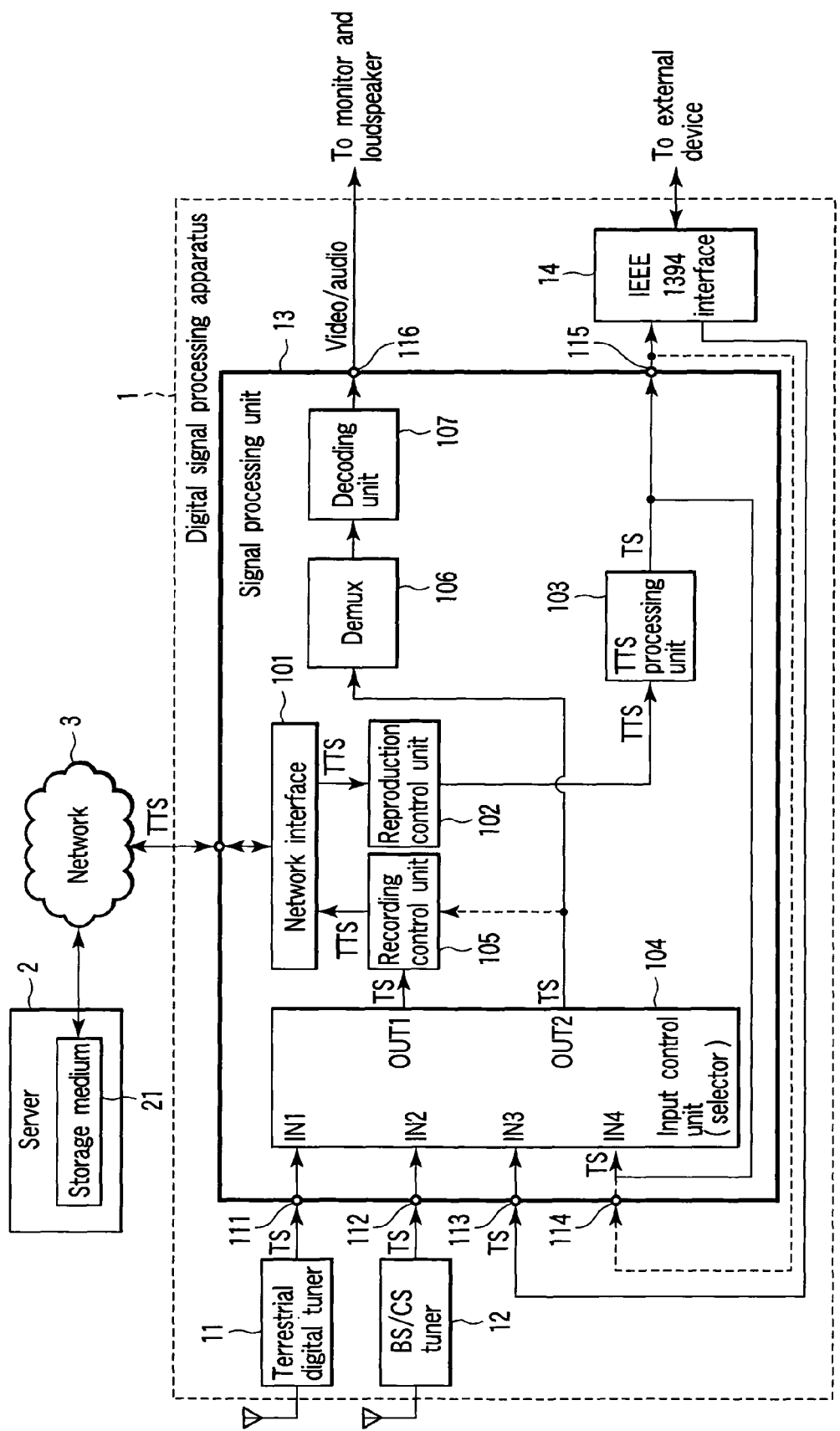
F I G. 1

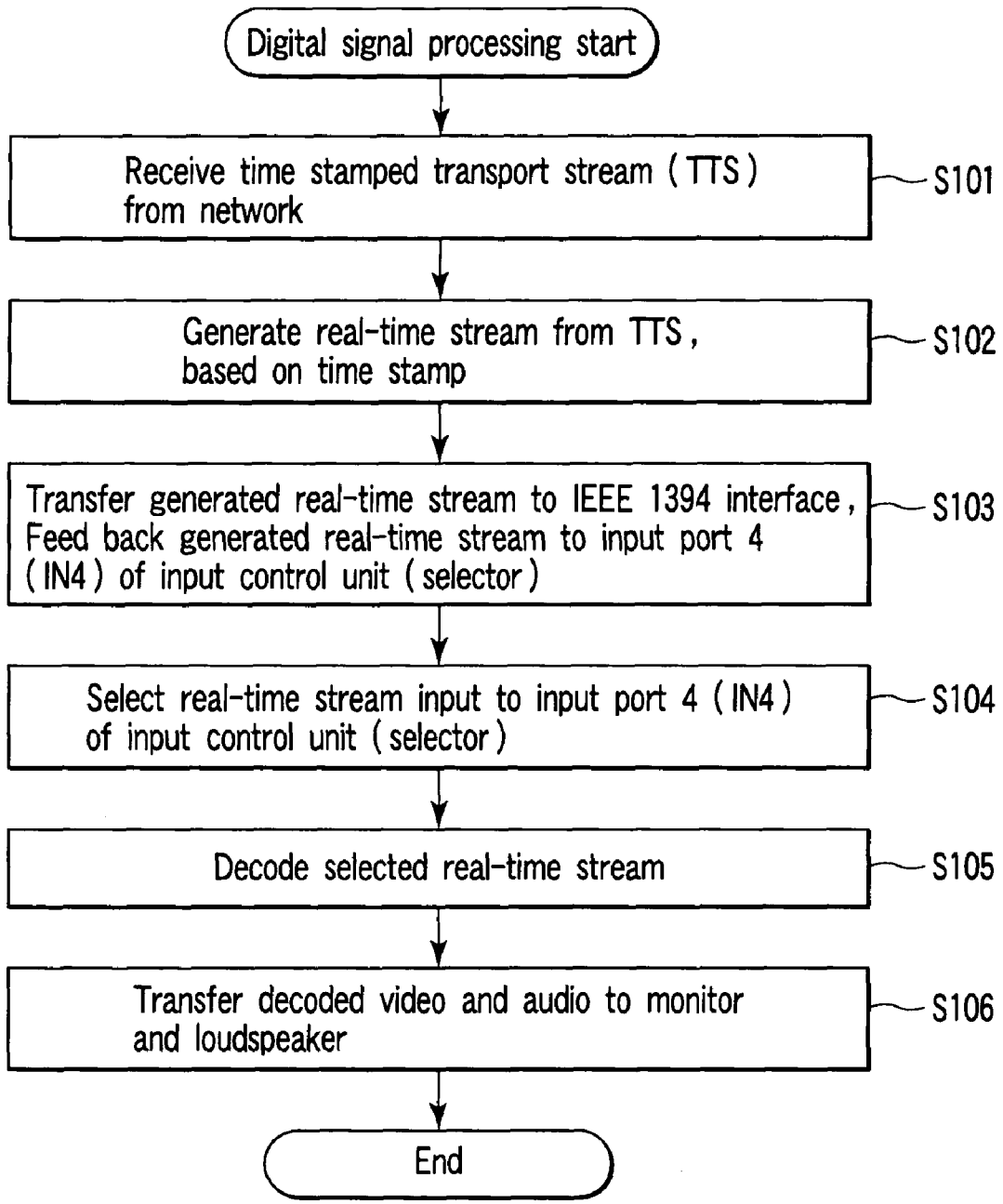
F I G. 6

SIGNAL PROCESSING APPARATUS AND STREAM PROCESSING METHOD

CROSS-REFERENCE TO RELATED APPLICATIONS

This application is based upon and claims the benefit of priority from prior Japanese Patent Application No. 2004-378293, filed Dec. 27, 2004, the entire contents of which are incorporated herein by reference.

BACKGROUND OF THE INVENTION

1. Field of the Invention

The present invention relates to a signal processing apparatus such as a digital broadcasting receiver and a stream processing method used for the same.

2. Description of the Related Art

In recent years, a real-time transmission system for transmitting, in real time, a data stream such as a digitally compression-encoded audio/video signal has been developed. The real-time transmission system executes the transmission of the data stream by using a transport stream. The transport stream is constituted by transport stream packets.

Recently, a system for transmitting groups of packets with time information respectively added thereto has been developed. For example, a data transmitting device for transmitting signal data with a count value of a counter added thereto is disclosed by Jpn. Pat. Appln. KOKAI Publication No. 2000-341234.

In a digital broadcast such as a terrestrial digital broadcasting, broadcast program data is formed by the above-mentioned transport stream.

In the digital broadcasting receiver, a broadcast signal is received and demodulated by a tuner then the transport stream is extracted from the broadcast signal. The transport stream packets constituting the transport stream are transmitted to the decoder in the broadcasting receiver in real time to be decoded there. The decoder is usually designed so that its decoding speed is determined in accordance with the receiving timing of each packet. Since each of the packets is transmitted to the decoder in real time at the timing corresponding to reproduction timing, the decoder can normally decode and reproduce the transport stream.

In the meantime, recently, a home network system capable of connecting a plurality of electrical household appliances with one another has been needed to be realized. The digital broadcasting receiver for use in the home network system needs a function for decoding and reproducing not only the transport stream transmitted in real time like the broadcast program data but also a transport stream transferred at an arbitrary speed via a network from a storage medium.

However, the transport stream read out from the storage medium is transmitted to the digital broadcast receiver at a higher speed than the intrinsic transport rate of the transport stream. Therefore, if the digital broadcast receiver directly inputs the transport stream transmitted from the storage medium via the network into the decoder, a failure such as the reproduction of the transport stream at an abnormally higher speed is caused. Accordingly, it is required for the digital broadcasting receiver to execute particular decode control to switch the operation control method of the decoder in accordance with a kind (real-time stream/non real-time stream) of the stream to be decoded.

The digital broadcasting receiver for use in the home network system also needs a function of recording the transport stream received via the network in an external device such as, for example, an IEEE 1394 standardized digital video cassette recorder (VCR). In this case, the transport stream is needed to be transmitted in real time to the external device.

BRIEF SUMMARY OF THE INVENTION

According to an embodiment of the present invention, there is provided a signal processing apparatus comprising a receiving unit which receives a stream includes compression-encoded data via a network, the stream being formed by packets to which time stamps are respectively added, a generating unit which generates a first real-time stream from the stream received by the receiving unit, based on the time stamps added to the packets in the stream received by the receiving unit to output the first real-time stream from an output port, a outputting unit which outputs the first real-time stream output from the output port outside, a selector unit having a first input port to which the output port is feedback-connected and which receives the first real-time stream output from the output port and a second input port which receives a second real-time stream including compression-encoded data and being transmitted in real time from outside, the selector unit selecting one of the first real-time stream input to the first input port and the second real-time stream input to the second input port, and a decoding unit which decodes the one real-time stream selected by the selector unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a system configuration of a signal processing apparatus according to an embodiment of the present invention;

FIG. 6 is a flowchart for explaining operations executed by the signal processing apparatus according to the embodiment.

DETAILED DESCRIPTION OF THE INVENTION

Figure 2:
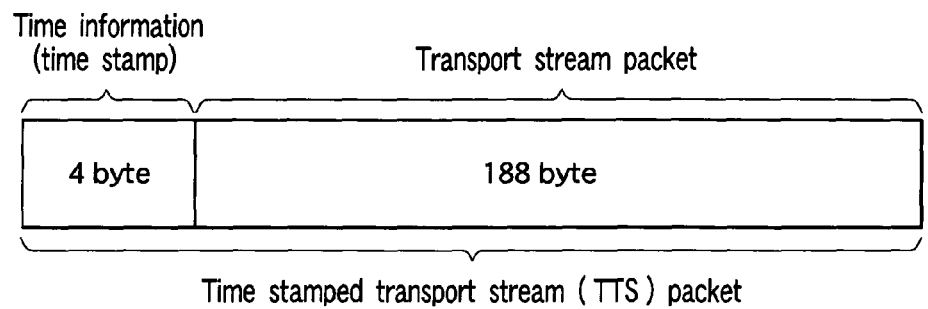
FIG. 2 is a view showing an example of a configuration of a time stamped transport stream (TTS) packet used for the signal processing apparatus according to the embodiment.

Hereinafter, an embodiment of the present invention will be described by referring the drawings.

FIG. 1 shows the configuration of the signal processing apparatus according to the embodiment of the present invention. The signal processing apparatus is achieved as a digital broadcasting receiver for receiving a digital broadcast signal.

The digital broadcasting receiver 1 has a function of connecting it to a network 3 such as an in-home local area network (LAN). The digital broadcasting receiver 1 can also perform a communication with an IEEE 1394 standardized external device.

A server computer 2 is connected to the network 3. A storage medium 21 of the server computer 2 stores an audio/video (AV) content. The digital broadcasting receiver 1 can receive the AV content stored in the medium 21 via the network 3 to decode and reproduce the received AV content.

The digital broadcasting receiver 1 includes a terrestrial digital tuner 11, a broadcasting satellite/communication satellite (BS/CS) tuner 12, a signal processing unit 13 and an IEEE 1394 interface 14.

The terrestrial digital tuner 11 is a broadcasting receiving unit for receiving broadcast program data of a terrestrial digital broadcasting. The terrestrial digital broadcasting of broadcast program data is formed by a transport stream (TS). A broadcast station transmits TS packets constituting the TS through the digital broadcasting signal in real time. The terrestrial digital tuner 11 receives the digital broadcasting signal and extracts the TS corresponding to broadcast program data in a certain channel from the digital broadcasting signal. The TS includes compression-encoded broadcast program data. This TS is a real-time stream. The terrestrial digital tuner 11 transmits the TS packets constituting the TS to the signal processing unit 13 in real time at the same timing as that of the transmission of the TS packets from the broadcast station.

The BS/CS tuner 12 is a broadcast receiving unit for receiving broadcast program data of a BS/CS broadcast. The broadcast program data of the BS/CS broadcast is also formed by a transport stream (TS) as with the case of the terrestrial digital broadcast. The broadcast station transmits the TS packets constituting the TS through the digital broadcasting signal in real time. The BS/CS tuner 12 receives the digital broadcast signal and extracts the TS corresponding to broadcast program data in a certain channel from the digital broadcasting signal. The TS includes compression-encoded broadcast program data. The TS is a real-time stream. The TS packets constituting the TS are transmitted from the BS/CS tuner 12 to the signal processing unit 13 in real time at the same timing as that of transmission of the TS packets from the broadcast station.

The interface 14 is a communication control device for performing a communication with an external device (e.g., a digital VCR) through an IEEE 1394 serial bus. The interface 14 has a function of receiving the TS of the AV content transmitted from the external device in real time. The interface 14 has a function of transmitting the TS transferred from the signal processing unit 13 in real time to the external device in real time through the IEEE 1394 serial bus.

The signal processing unit 13 is an LSI for processing the TS. The signal processing unit 13 has a function for receiving the AV content transferred from the storage medium 21 of the server computer 2. The stream of the AV content stored in the storage medium 21 is a non real-time stream readable thereform at an arbitrary speed regardless of an intrinsic transmission rate corresponding to its reproduction. When receiving a request from the signal processing unit 13, the stream of the AV content stored in the storage medium 21 is transmitted to the digital broadcasting receiver 1 via the network 3 at the higher speed than the intrinsic transmission rate of the AV content.

The stream of the AV content is formed of a TTS. The TTS is constituted by TTS packets. Each TTS packet is a TS packet with a time stamp added thereto. The server computer 2 reads out the TTS from the storage medium 21 to transmit it to the digital broadcasting receiver 1.

FIG. 2 shows the configuration of the TTS packet. The TTS packet is constituted by a 188-byte TS packet and a 4-byte time stamp (time information) added to the head of the TS packet. Time stamps added to each TS packet are used as time information indicating relative input time to decoders of the corresponding TS packets.

The signal processing unit 13 includes a network interface unit 101, a reproduction control unit 102, a TTS processing unit 103, an input control unit (selector) 104, recording control unit 105, a demultiplexer (Demux) 106 and a decoding unit 107.

The interface unit 101 is connected to the network 3 via an LAN port, etc., provided in the digital broadcasting receiver 1. The interface unit 101 is a communication control device performing the communication with the server computer 2 via the network 3. The interface unit 101 receives the TTS transmitted from the server computer 2 via the network 3. The received TTS is input to the TTS processing unit 103 via the reproduction control unit 102.

The TTS processing unit 103 generates a real-time stream from the TTS, based on each time stamp of the TTS packet group in the received TTS. That is, the TTS transmitted via a network is damaged in real-time property and received at an arbitrary data length regardless of time stamp. The real-time stream is formed by TS.

That is to say, the TTS processing unit 103 adjusts transmission timing of the TS packet in each of the TTS packet in accordance with the time stamps of each of the received TTS packet. Accordingly, the output port of the TTS processing unit 103 outputs the TS packets of which the real-time property is secured therein.

The output port of the TTS processing unit 103 is connected to an output terminal 115 of the signal processing unit 13. The output port of the TTS processing unit 103 is feedback-connected to an input port (IN4) of the input control unit (selector) 104. The TS generated from the TTS processing unit 103, as the real-time stream, is transmitted to the interface 14 via the output terminal 115. At the same time, the TS is transmitted to the input port (IN4) of the input control unit (selector) 104.

The input control unit (selector) 104 has input ports IN1, IN2, IN3 and IN4 for respectively inputting the real-time streams and output ports OUT1 and OUT2 for respectively outputting the real-time streams.

The input ports IN1 to IN4 of the input control unit (selector) 104 are connected to input terminals 111, 112, 113 and 114 of the signal processing unit 13, respectively. The TS received by the digital tuner 11 is input to the input port IN1 of the input control unit (selector) 104 through the input terminal 111. The TS received by the BS/CS tuner 12 is input to the input port IN2 of the input control unit (selector) 104 through the input terminal 112. The TS received from the external device by the interface 14 is input to the input port IN3 of the input control unit (selector) 104.

The output port of the TTS processing unit 103 is connected to the input port IN3 of the input control unit (selector) 104. The output terminal 115 may be feedback-connected to the input terminal 114.

The input control unit (selector) 104 selects a TS to be reproduced among TS which are input to the input ports IN1 to IN4, respectively to output the selected TS from the output port OUT2. The TS output from the output port OUT2 is transmitted to the decoding unit 107 through the demultiplexer (Demux) 106.

The input control unit (selector) 104 selects the TS to be recorded on the storage medium 21 among the TSs which are input to the input port group (IN1 to IN4), respectively, to output the selected TS from the output port OUT1. The TS output from the output port OUT1 is transmitted to the recording control unit 105.

The TS which is output from the output port OUT2 may be input to the recording control unit 105.

The recording control unit 105 generates the TTS from the input TS by adding time stamps to each of the packets included in the input TS. The TTS is transmitted to the server computer 2 on the network 3 via the interface unit 101.

The demultiplexer (Demux) 106 executes a processing to separate the TS input from the input control unit (selector) 104 into video data (video stream) and audio data (audio stream). This separation processing is executed, for example, by every TS packet. When a plurality of broadcast programs are multiplexed to the input TS, the demultiplexer (Demux) 106 also executes a processing to extract the TS packets corresponding to the broadcast program to be reproduced from the TS.

The decoding unit 107 is a decoder to respectively decode the video data and the audio data which are input from the demultiplexer (Demux) 106. The decoding unit 107 is designed so as to determine the decoding speed in response to the receiving timing of each TS packet. The decoding unit 107 outputs the video data and the audio data decoded thereby to a monitor and a loudspeaker via an output terminal 116, respectively.

The digital broadcasting receiver 1 converts the stream transmitted from the network 3 into the real-time stream by the TTS processing unit 103. The real-time stream is transmitted to the external device through the IEEE 1394 interface 14 in real time and also fed back to the input port IN4 of the input control unit (selector) 104. Any of the stream groups which are input to the input ports IN1 to IN4 is the real-time stream. Therefore, even when any input stream is selected as a stream to be reproduced, the stream to be reproduced is transmitted to the decoding unit 107 in real time at a transmission rate corresponding to the reproduction rate (frame rate) of the corresponding stream. Even when any input stream is selected as a stream to be reproduced, the decoding unit 107 can normally decode the corresponding stream to be reproduced. Accordingly, the digital broadcasting receiver 1 can transmit the stream to the external device while decoding the stream transmitted through the network 3 without particular decoding control which changes a control method of decoding timing in accordance with the kind (real-time stream/non real-time stream) of the stream.

The configuration of the TTS processing unit 103 will be described with reference to FIG. 3 below.

Figure 3:
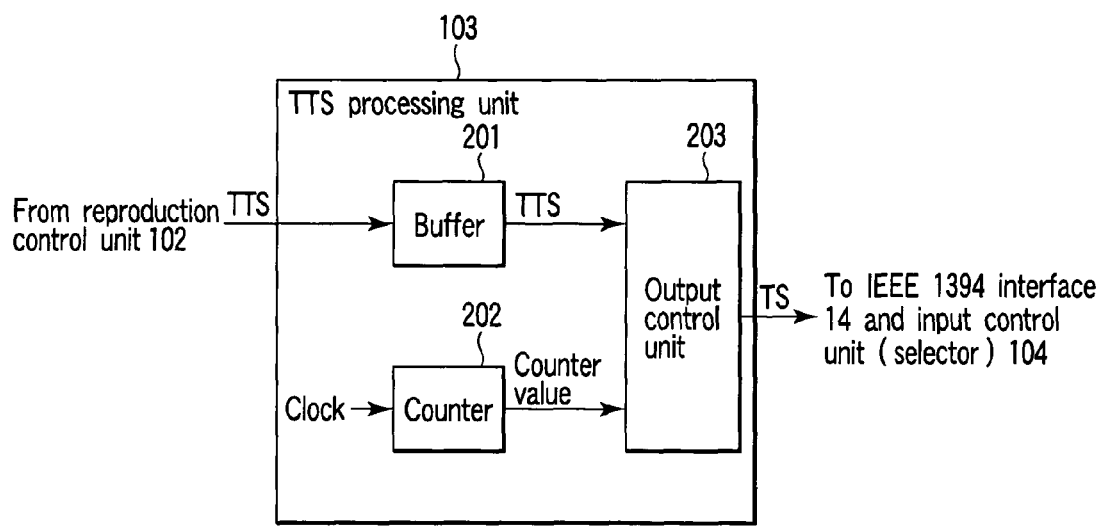
FIG. 3 is a block diagram showing a configuration of a TTS processing unit provided in the signal processing apparatus according to the embodiment.

The TTS processing unit 103, shown in FIG. 3, includes of a buffer 201, a counter 202 and an output control unit 203.

The buffer 201 is a storage area to temporarily store the TTS packet which is input from the reproduction control unit 102. The counter 202 executes a count operation in synchronization with a clock signal from a clock generator provided in the signal processing unit 13. The output control unit 203 reads out and outputs a TS packet part of the TTS packet in which a value of a time stamp is matched with a count value from a counter 202 among TTS packets stored in the buffer 201. Therefore, the TS packets are transferred to the interface 14 and the input control unit (selector) 104 in real time, respectively.

Figure 4:
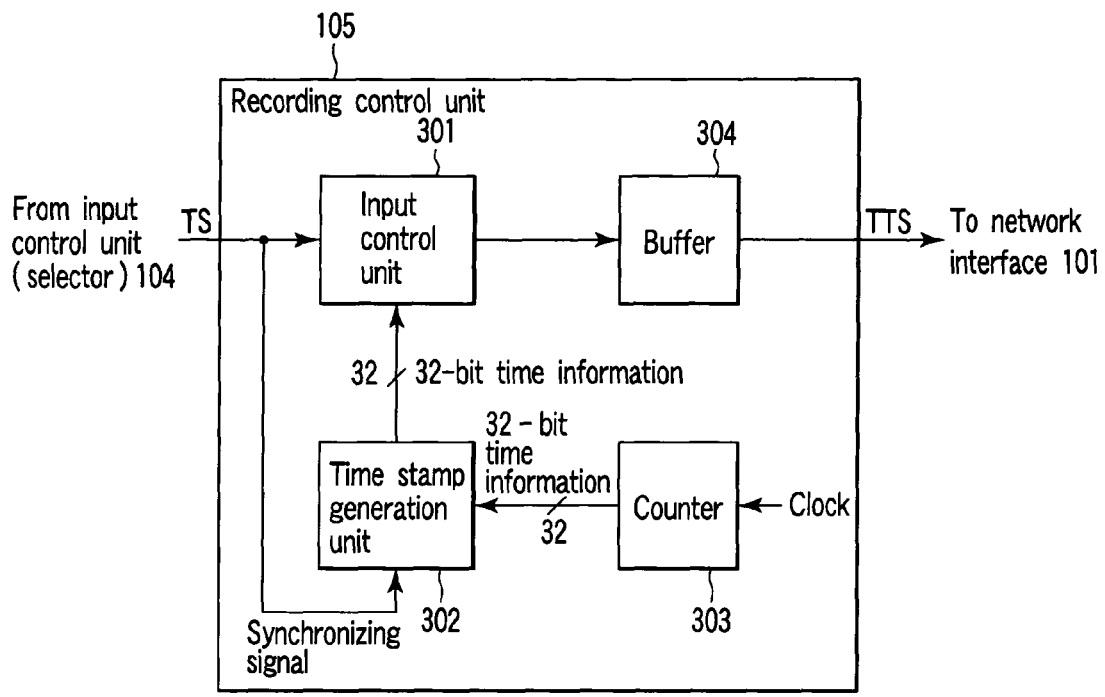
FIG. 4 is a block diagram showing a configuration of a recording control unit provided in the signal processing apparatus regarding the embodiment.

Next to this, the configuration of the recording control unit 105 will be described by referring to FIG. 4.

Figure 5:
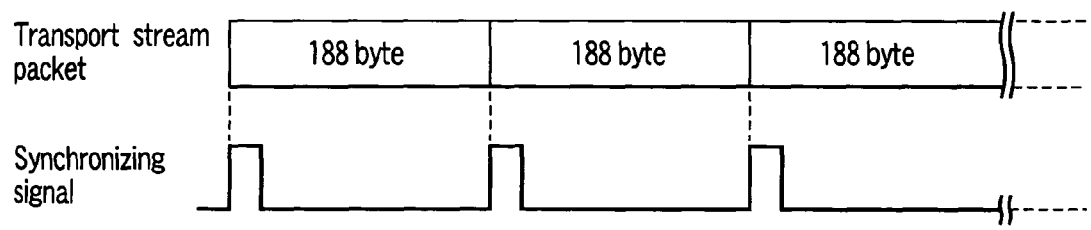
FIG. 5 is a view for explaining a relation between the transport stream packet and a synchronizing signal used for the signal processing apparatus according to the embodiment.

The recording control unit 105 includes an input control unit 301, a time stamp generation unit 302, a counter 303 and a buffer 304. The recording control unit 105 receives the TS which is output from the input control unit (selector) 104. The TS, as shown in FIG. 5, constituted by TS packets and synchronizing signals. The synchronizing signals indicate separations between TS packets. The TS packets are input to the input control unit 301 and the synchronizing signals are input to the time stamp generation unit 302.

The counter 303 executes the count operation in synchronization with the foregoing clock signal to output a counter value of 32-bit as time information. When receiving the rising edge of the synchronizing signal, the time stamp generation unit 302 outputs the counter value (time information) of 32-bit at this time to the input control unit 301.

The input control unit 301 generates TTS packets by adding the counter values (time information) of 32-bit from the time stamp generation unit 302 to the heads of the received TS packets. The generated each TTS packet is transmitted to the network interface unit 101 via the buffer 304.

Next, operations for transmitting the stream received from the network 3 to the external device while reproducing it will be described by referring to the flowchart in FIG. 6.

The digital broadcasting receiver 1 receives the TTS transmitted from the server computer 2 via the network 3 (step S101). The received TTS is transmitted to the TTS processing unit 103. The TTS processing unit 103 generates the real-time stream from the received TTS based on the time stamps of each TTS packet (step S102). This real-time stream is the TS.

The generated real-time stream is transmitted to the interface part 14 and also fed back to the input port IN4 of the input control unit (selector) 104 (step S103). The input control unit (selector) 104 selects the real-time stream which is input to the input port IN4 to output the selected real-time stream from the output port OUT2 (step S104). The real-time stream which is output from the output port OUT2 is transmitted to the decoding processing unit 107 via the demultiplexer (Demux) 106.

The decoding unit 107 decodes the real-time stream which is output from the output port OUT2 (step S105). The video data and the audio data decoded by the decoding unit 107 are output to the monitor and the loudspeaker respectively (step S106).

As described above, the signal processing apparatus according to the embodiment of the present invention can normally reproduce the stream received from the network 3 and transmit to record the stream to the external device in real time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing apparatus comprising:
   a receiving unit which receives a non real-time stream including compression-encoded data via a network, the stream being formed by packets to which time stamps are respectively added;
   a generating unit which generates a first real-time stream from the stream received by the receiving unit, based on the time stamps added to the packets in the stream received by the receiving unit to output the first real-time stream from an output port;
   a broadcast receiving section configured to receive a broadcast signal and to output a second real-time stream including compression-encoded broadcast program data;

a selector unit having a first input port connected to the output port and a second input port connected to the broadcast receiving section to input the second real-time stream, the first real-time stream generated from the non real-time stream being fed back internally within the signal processing apparatus from the generating unit to the first input port, the selector unit selecting one of the first real-time stream input to the first input port and the second real-time stream input to the second input port; and a decoding unit which decodes the one real-time stream selected by the selector unit.

2. The signal processing apparatus according to claim 1, further comprising:

time stamp adding unit which adds time stamps to packets included in the one real-time stream selected by the selector unit; and a transmitting unit which transmits the packets with the time stamps added thereto by the adding unit via the network.

3. The signal processing apparatus according to claim 1, wherein the generating unit includes:

a buffer unit which stores packets in a stream received by the receiving unit;

a counter unit; and a reading unit which reads out a packet, of which a value of the time stamp matches with a count value of the counter unit among the packets stored in the buffer unit, from the buffer unit to the outputting unit.

4. A stream processing method applied to a signal processing apparatus, comprising:

receiving a non real-time stream which includes compression-encoded data, the stream being formed by packets to which time stamps are respectively added;

generating a first real-time stream from the received stream, based on the time stamps added to the packets in the received stream, to output the first real-time stream from an output port;

receiving a broadcast signal and outputting a second real-time stream including compression-encoded broadcast program data;

selecting one of the first real-time stream output from the output port and a second real-time stream by a selector unit having a first input port connected to the output port and a second input port receiving the second real-time stream, the first real-time stream generated from the non real-time stream being fed back internally within the signal processing apparatus to the first input port; and decoding the selected one real-time stream.

5. The stream processing method according to claim 4, further comprising:

adding time stamps to packets included in the one real-time stream selected by the selector; and transmitting the packets to which the time stamps are added in the adding.

6. The stream processing method according to claim 4, wherein the generating includes:

storing the packets in the stream received in the receiving onto a buffer unit in the signal processing apparatus; and reading a packet, of which a value of the time stamp matches with a count value of a counter unit among packets stored in the buffer unit, from the buffer unit for the outputting.

* * * * *